United States Patent [19]
Derocher et al.

[11] Patent Number: 6,078,497
[45] Date of Patent: Jun. 20, 2000

[54] PORTABLE ELECTRONIC DEVICE HAVING AN ENHANCED SPEAKER SYSTEM

[75] Inventors: Michael D. Derocher; Glen Oross; Robert P. Bliven, all of Corvallis; Dennis R. Esterberg, Philomath; Gerald W. Steiger, Corvallis, all of Oreg.

[73] Assignee: Hewlett-Packard Company, Palo Alto, Calif.

[21] Appl. No.: 09/240,895

[22] Filed: Jan. 29, 1999

[51] Int. Cl.[7] .............................. H05K 5/00; G06F 1/16
[52] U.S. Cl. ........................... 361/683; 345/905; 381/87; 381/388
[58] Field of Search .................................. 361/683, 681, 361/682, 686, 724–727; 353/119, 120, 122; 345/169, 905; 248/917–924; 381/87, 88, 385–387, 388

[56] References Cited

U.S. PATENT DOCUMENTS

| | | | |
|---|---|---|---|
| 4,441,577 | 4/1984 | Kurihara | 181/147 |
| 4,630,303 | 12/1986 | Tanno | 381/87 |
| 5,214,514 | 5/1993 | Haberkern | 358/335 |
| 5,321,760 | 6/1994 | Gray | 381/86 |
| 5,610,992 | 3/1997 | Hickman | 381/188 |
| 5,646,280 | 7/1997 | Honda et al. | 361/683 |
| 5,668,882 | 9/1997 | Hickman et al. | 381/24 |
| 5,689,400 | 11/1997 | Ohgami et al. | 361/683 |
| 5,708,561 | 1/1998 | Huilgol et al. | 361/681 |
| 5,768,163 | 6/1998 | Smith, II | 364/705.01 |
| 5,825,614 | 10/1998 | Kim | 361/683 |
| 5,838,537 | 11/1998 | Lundgren et al. | 361/683 |
| 5,880,928 | 3/1999 | Ma | 361/683 |
| 5,917,695 | 6/1999 | Youn | 361/683 |

FOREIGN PATENT DOCUMENTS

| | | | |
|---|---|---|---|
| 0816973A1 | 1/1998 | European Pat. Off. | G06F 1/16 |
| 0816973A1 | 7/1998 | European Pat. Off. | G06F 1/16 |
| 405324124 | 12/1993 | Japan | G06F 1/16 |
| 408171477 | 7/1996 | Japan | G06F 3/16 |
| 409311776 | 12/1997 | Japan | G06F 3/16 |

*Primary Examiner*—Leo P. Picard
*Assistant Examiner*—Anatoly Vortman
*Attorney, Agent, or Firm*—Curtis G. Rose

[57] ABSTRACT

A portable electronic device has an outer shell, a first speaker assembly, and a second speaker assembly. The first speaker assembly has a first speaker, a first speaker chamber, and an outer edge. The second speaker assembly has a second speaker, a second speaker chamber, and an outer edge. The first and second speaker assemblies are capable of being in a normal position, where the first speaker assembly outer edge and the second speaker assembly outer edge are substantially flush with the outer shell of said portable electronic device. The first and second speaker assemblies are also capable of being in an extended position, where the first speaker assembly outer edge and the second speaker assembly outer edge extend beyond the outer shell of the portable electronic device. Preferably, the first and second speaker chambers each have a larger volume when the first and second speaker assemblies are in the extended position than when they are in the normal position. This larger volume allows for higher quality sound—especially lower frequency sounds—to come from the portable electronic device when the first and second speaker assemblies are in the extended position. Preferably, the speaker assemblies are located in a hinged portion connecting a base portion of the portable electronic device with a display portion.

19 Claims, 11 Drawing Sheets

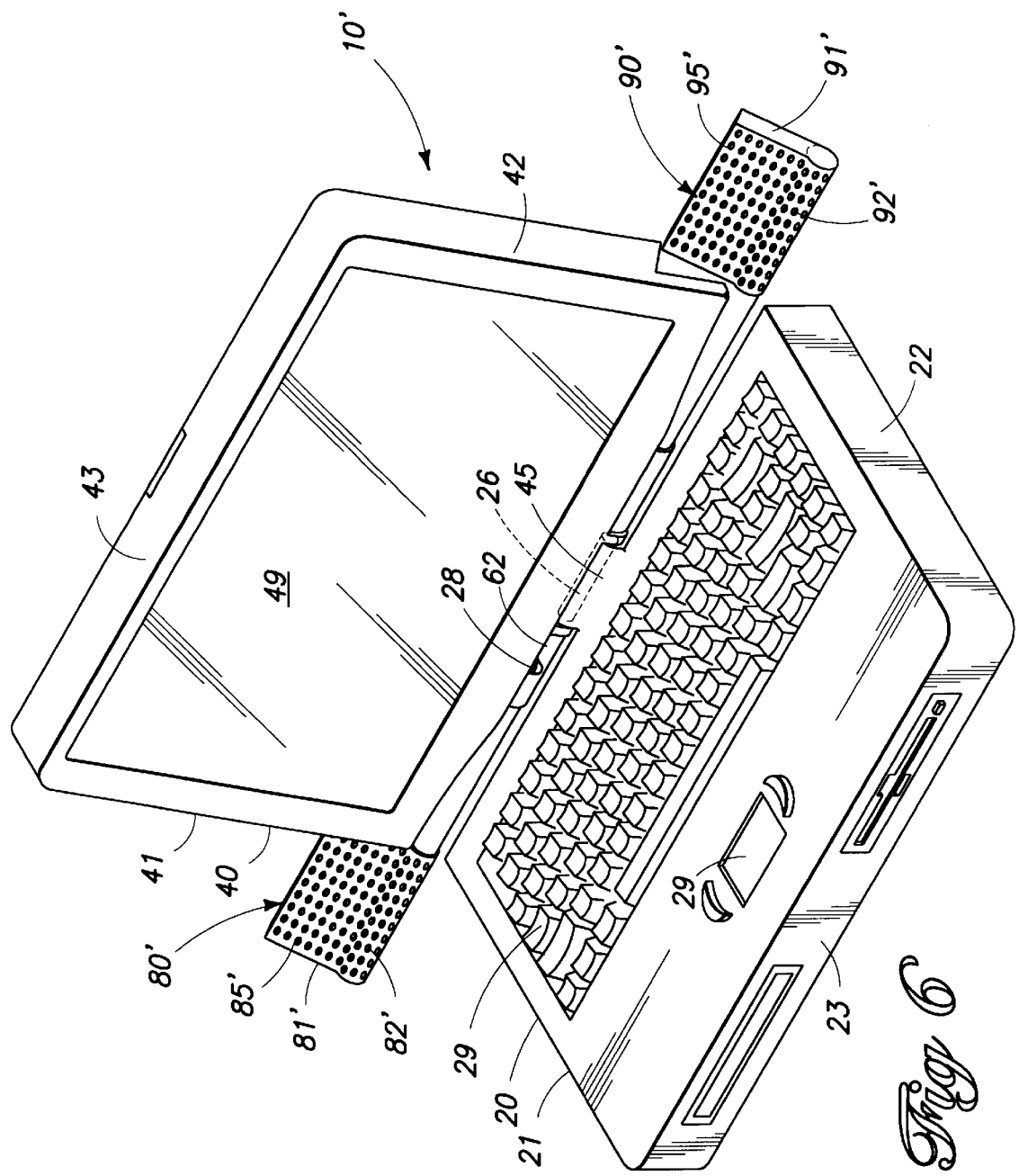

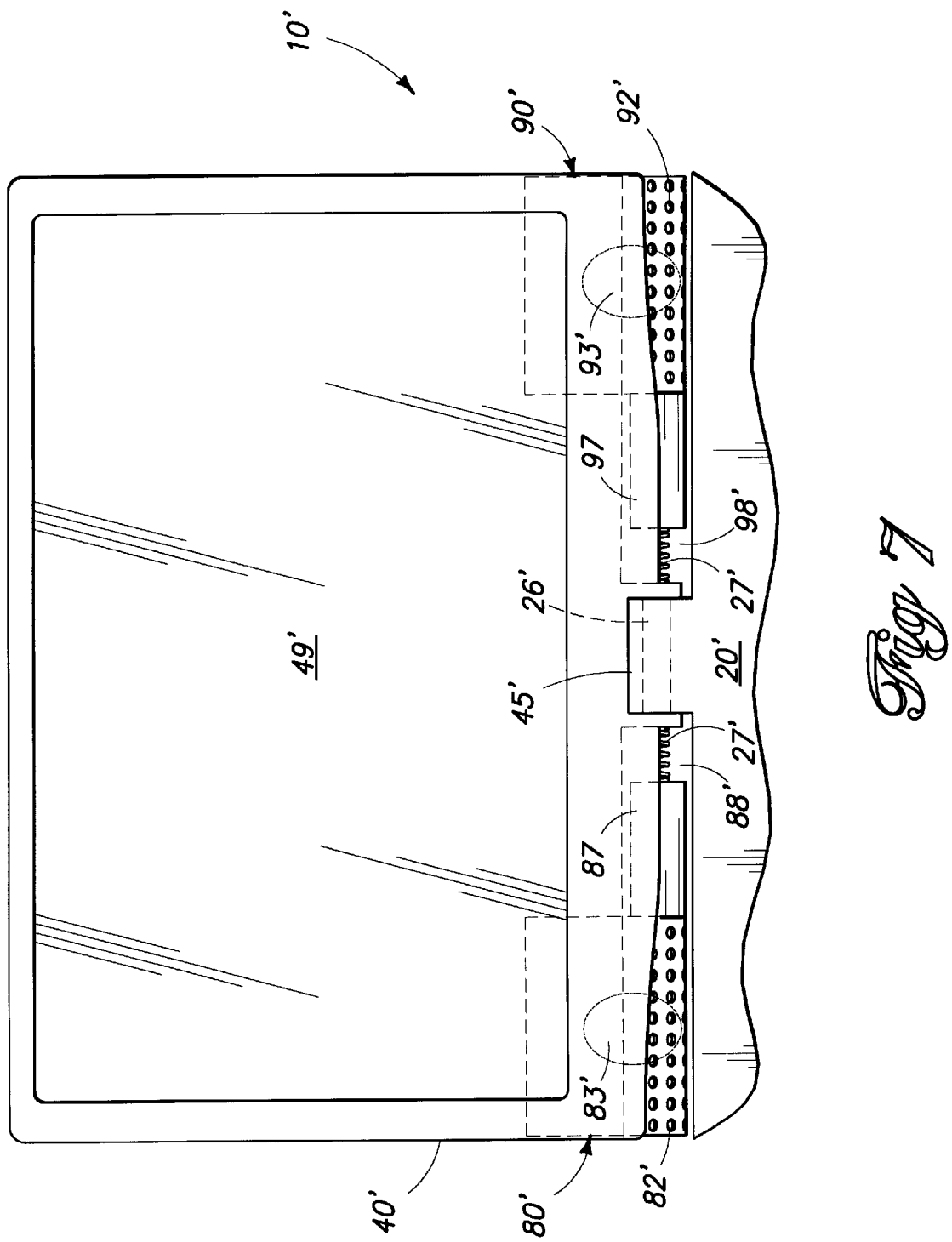

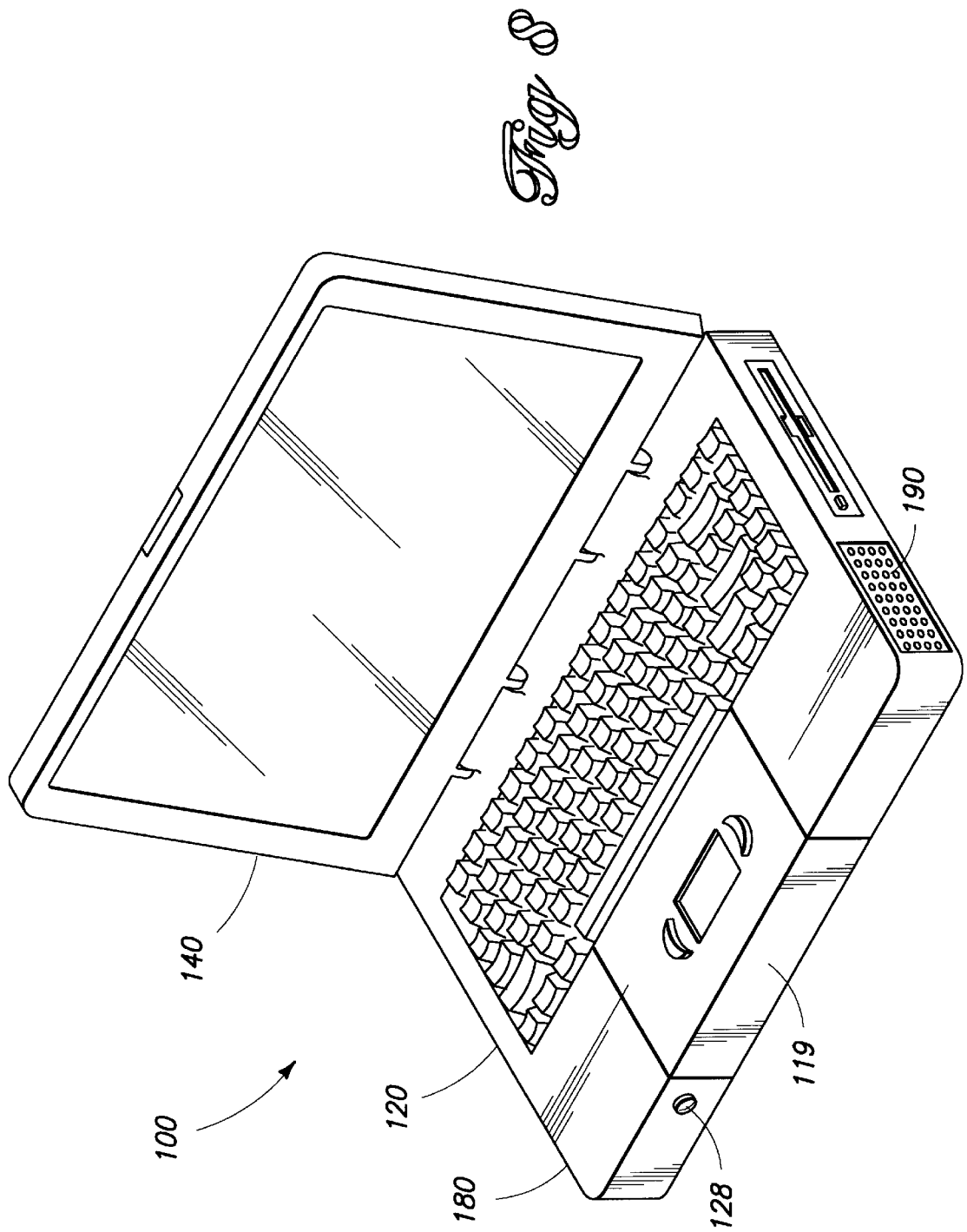

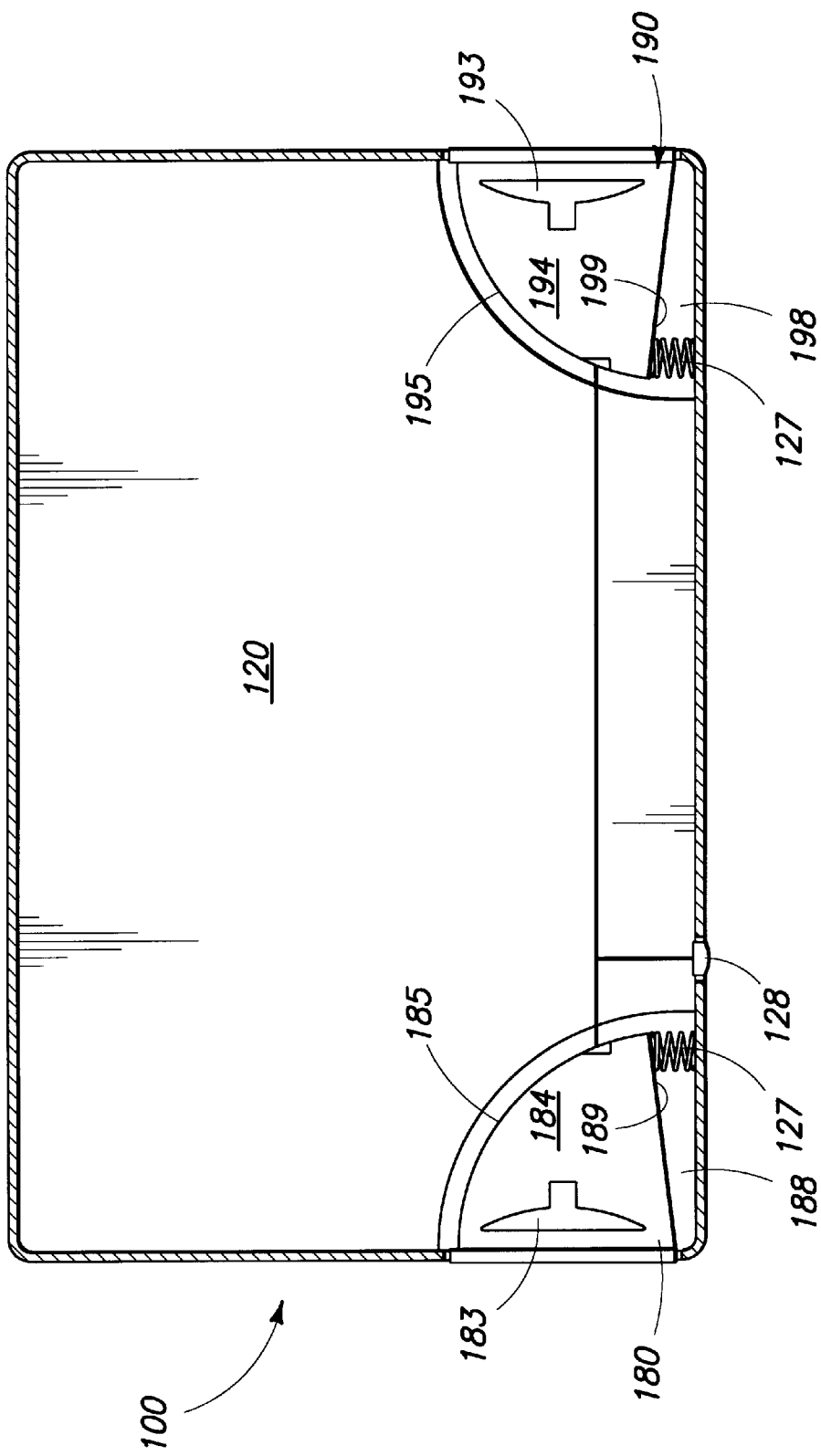

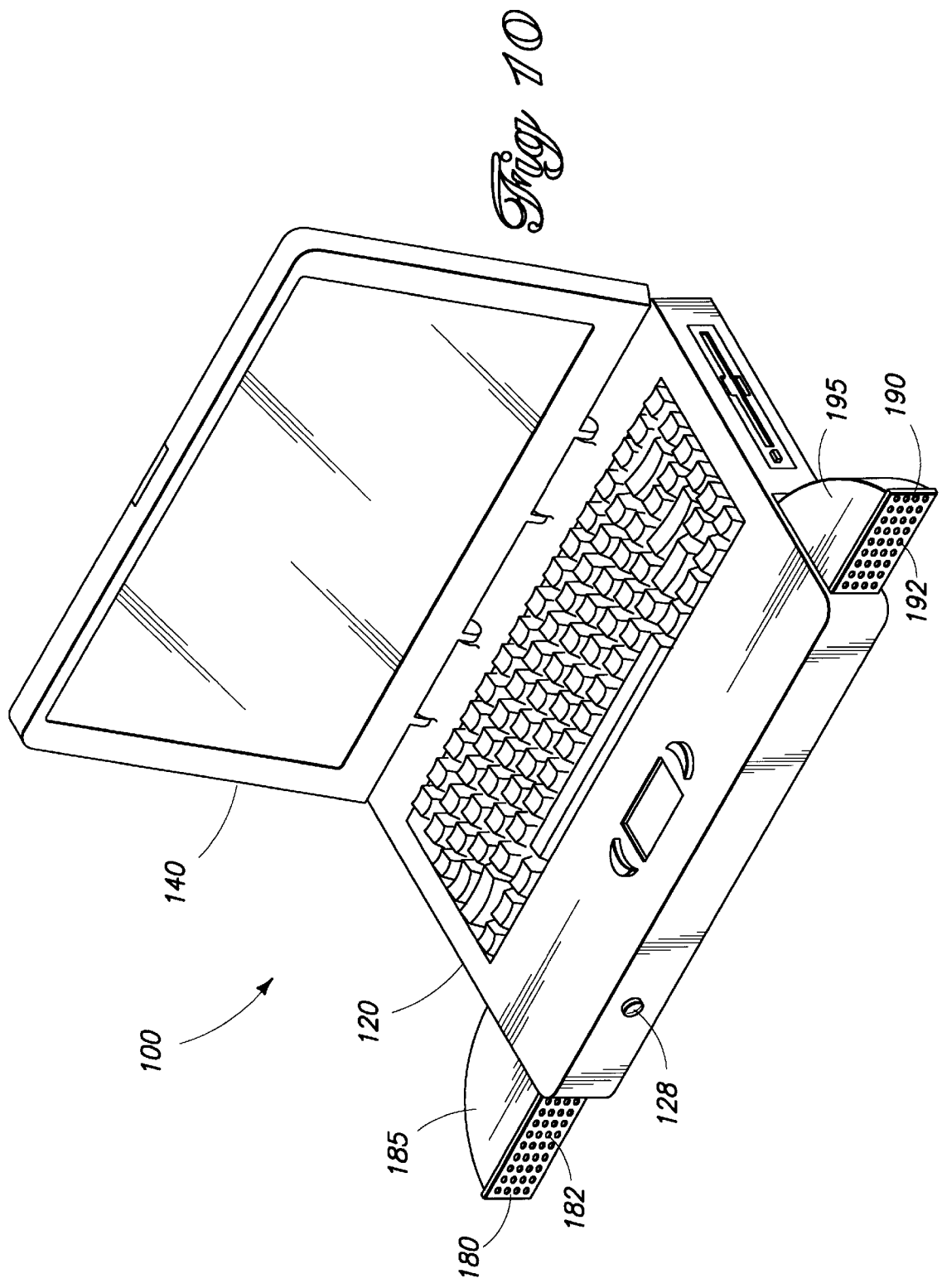

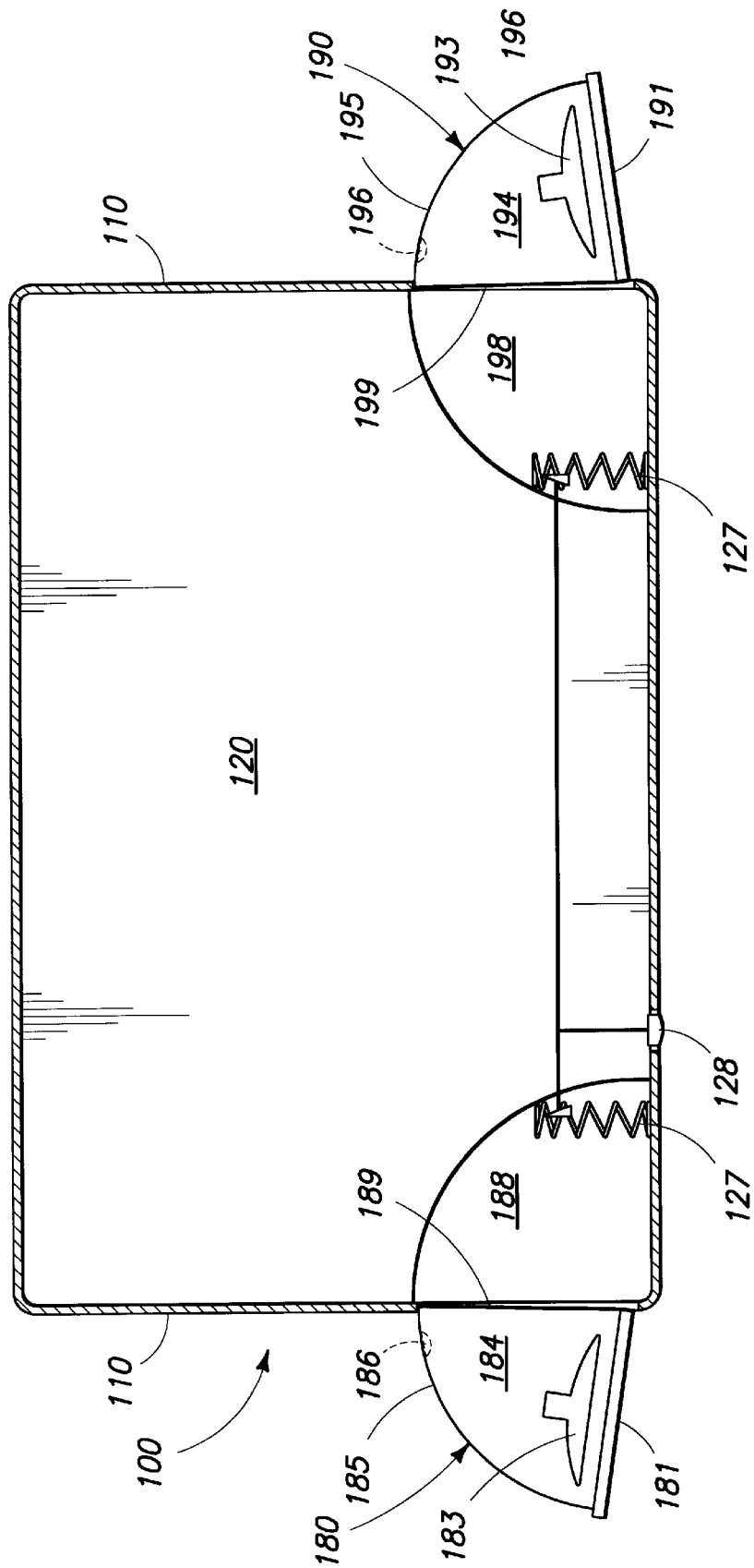

PORTABLE ELECTRONIC DEVICE HAVING AN ENHANCED SPEAKER SYSTEM

FIELD OF THE INVENTION

This invention relates to the electronics circuitry field. More particularly, this invention is a portable electronic device having an enhanced speaker system.

BACKGROUND OF THE INVENTION

A portable electronic device, such as a conventional notebook computer, is approximately the size of a standard sheet of paper, (21.6 cm by 27.9 cm; or in English units, 8.5 inches by 11.0 inches). The thickness of such a notebook computer typically ranges from 1.9 cm to 6.0 cm or more. In efforts to increase transportability and usability, the evolution has been toward smaller, lighter portable computers. The typical notebook computer includes a display screen housing hinged to a keyboard housing. The display screen housing folds down against the keyboard where the two housings latch together. A processor board, keyboard and disk drive often are mounted within the keyboard housing. Additional features include input/output ports and one or more compartments for receiving PC cards, (i.e., peripheral devices conforming to the personal computer memory card international association (PCMCIA) standards for personal computer-based peripherals). In an effort to bring multimedia applications to the notebook computer, loudspeakers and sound cards also may be included.

The shortcoming of loudspeakers used within notebook computers or other portable electronic devices is the generally inferior sound quality achieved relative to conventional stereophonic shelf-top speakers, or even, internal or external speakers used with desktop computers. One reason for the poorer sound quality is the relatively smaller speaker sizes. The smaller speaker size makes it difficult to produce quality sound over a wide frequency range, and particularly at lower frequencies. Coupled with the restricted speaker-box volume in which the loudspeaker is housed, quality sound at lower frequencies is difficult to achieve. Larger speaker-boxes provide space for accommodating given wavelengths of sound waves. Increasing the size of a notebook computer to accommodate significant speaker-box sizes is undesirable, however. Such inclusion would be a trade-off on the transportability of the computer. Accordingly, there is a need for a speaker configuration in a portable electronic device such as a notebook computer which improves sound quality without increasing the size requirements of the computer housing.

One attempt to solve this problem is disclosed in commonly assigned U.S. Pat. No. 5,668,882 to Hickman et al. This patent discloses the use of a lower frequency speaker mounted within the keyboard housing, in addition to two higher frequency speakers mounted in the display housing. While effective at solving this problem mentioned above, the additional cost associated with the lower frequency speaker may not be desirable in all circumstances.

SUMMARY OF THE INVENTION

A portable electronic device has an outer shell, a first speaker assembly, and a second speaker assembly. The first speaker assembly has a first speaker, a first speaker chamber, and an outer edge. The second speaker assembly has a second speaker, a second speaker chamber, and an outer edge. The first and second speaker assemblies are capable of being in a normal position, where the first speaker assembly outer edge and the second speaker assembly outer edge are substantially flush with the outer shell of said portable electronic device. The first and second speaker assemblies are also capable of being in an extended position, where the first speaker assembly outer edge and the second speaker assembly outer edge extend beyond the outer shell of the portable electronic device. Preferably, the first and second speaker chambers each have a larger volume when the first and second speaker assemblies are in the extended position than when they are in the normal position. This larger volume allows for higher quality sound—especially lower frequency sounds—to come from the portable electronic device when the first and second speaker assemblies are in the extended position. Preferably, the speaker assemblies are located in a hinged portion connecting a base portion of the portable electronic device with a display portion.

DESCRIPTION OF THE DRAWINGS

FIG. 6 shows a portable electronic device of an alternate embodiment of the invention, where the speaker assemblies are in an extended position.

FIG. 7 shows the hinged portion of the portable electronic device of the alternate embodiment of FIG. 6 in more detail, where the speaker assemblies are in a normal position.

FIG. 8 shows a portable electronic device of another alternate embodiment of the invention, where the speaker assemblies are in a normal position and are located near the front of the portable electronic device.

FIG. 9 shows the front portion of the portable electronic device of FIG. 8 in more detail.

FIG. 10 shows the portable electronic device of the alternate embodiment of FIG. 8, where the speaker assemblies are in an extended position.

FIG. 11 shows the front portion of the portable electronic device of FIG. 10 in more detail.

DETAILED DESCRIPTION OF THE PREFERRED EMBODIMENT

Figure 1:
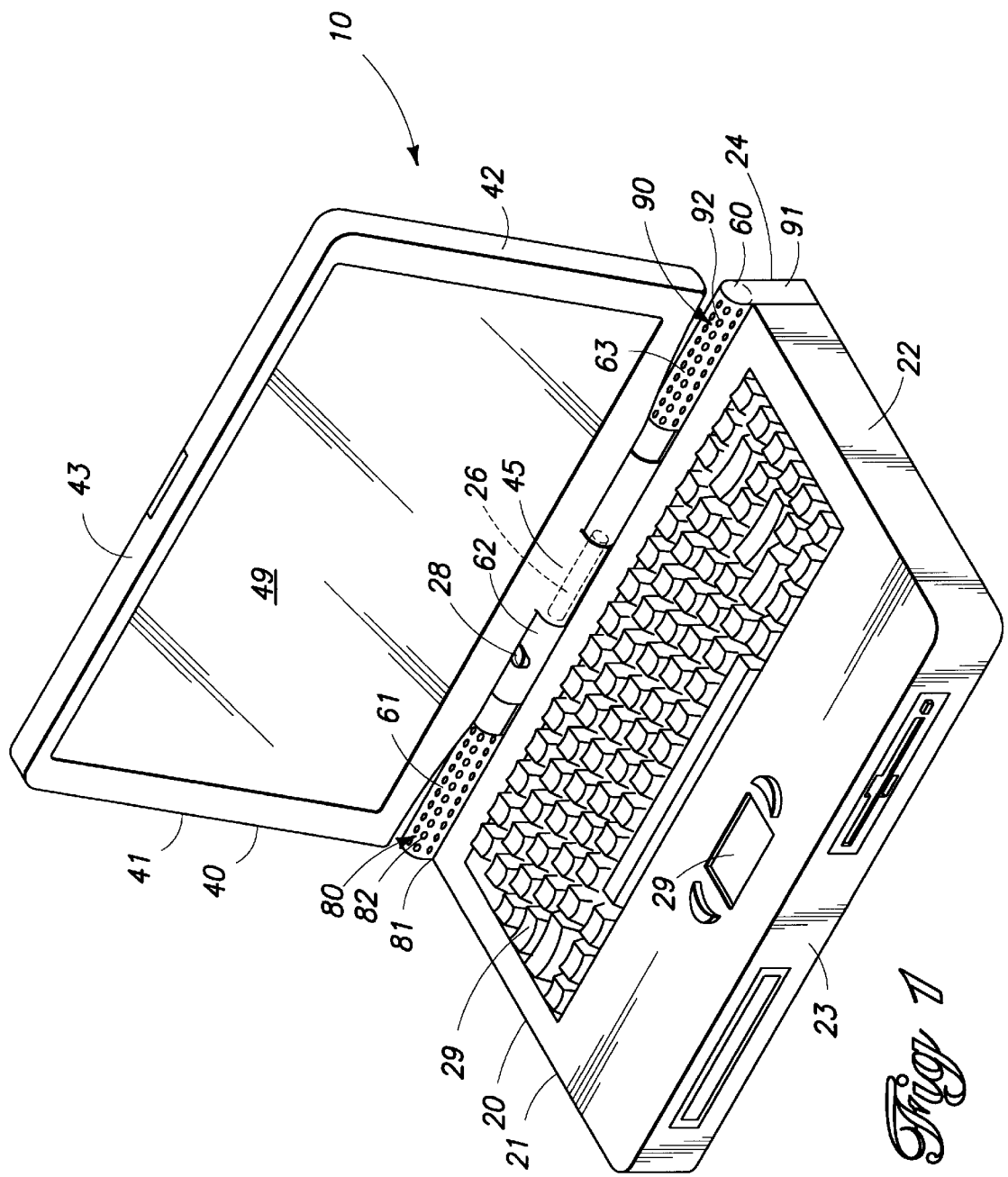
FIG. 1 shows the portable electronic device of the preferred embodiment of the invention, where the display portion is in an open position, and where the speaker assemblies are in the normal position.

FIG. 1 shows the portable electronic device of the preferred embodiment of the invention, where the display portion is in an open position, and where the speaker assemblies are in the normal position. Electronic device 10 is represented as a laptop computer, such as an OmniBook laptop computer manufactured by the Hewlett-Packard Company, although other electronic devices have been contemplated, such as portable CD players, DVD players, radios, tape players, TVs, etc., that fall within the spirit and scope of the invention. Electronic device 10 has a base portion 20, and a display portion 40. Hinged portion 60 connects base portion 20 with display portion 40, in a manner that will be described in more detail later. Base portion 20 includes left side base edge 21, right size base edge 22, front base edge 23, and back base edge 24. Base portion 20 also includes input device 29, such as a keyboard, track pad, etc. Display portion 40 includes left side display edge 41, right side display edge 42, front display edge 43, and back display edge 44. The top, bottom, and edges of base portion 20 and display portion 40 collectively make up the outer shell of electronic device 10. Display portion 40 also includes display 49.

Hinged portion 60 includes left section 61, center section 62, and right section 63. Speaker assembly 80 is located in left section 61 of hinged portion 60. Likewise, speaker assembly 90 is located in right section 63 of hinged portion 60. Speaker grille 82 and speaker grille 92 are positioned to direct sound from speakers 83 and 93 located in speaker assembly 80 and speaker assembly 90, respectively (FIG. 3) to a user of portable electronic device 10, regardless of whether display portion 40 is in an open position, as shown in FIG. 1, or in a closed position, as shown in FIG. 2.

Figure 2:
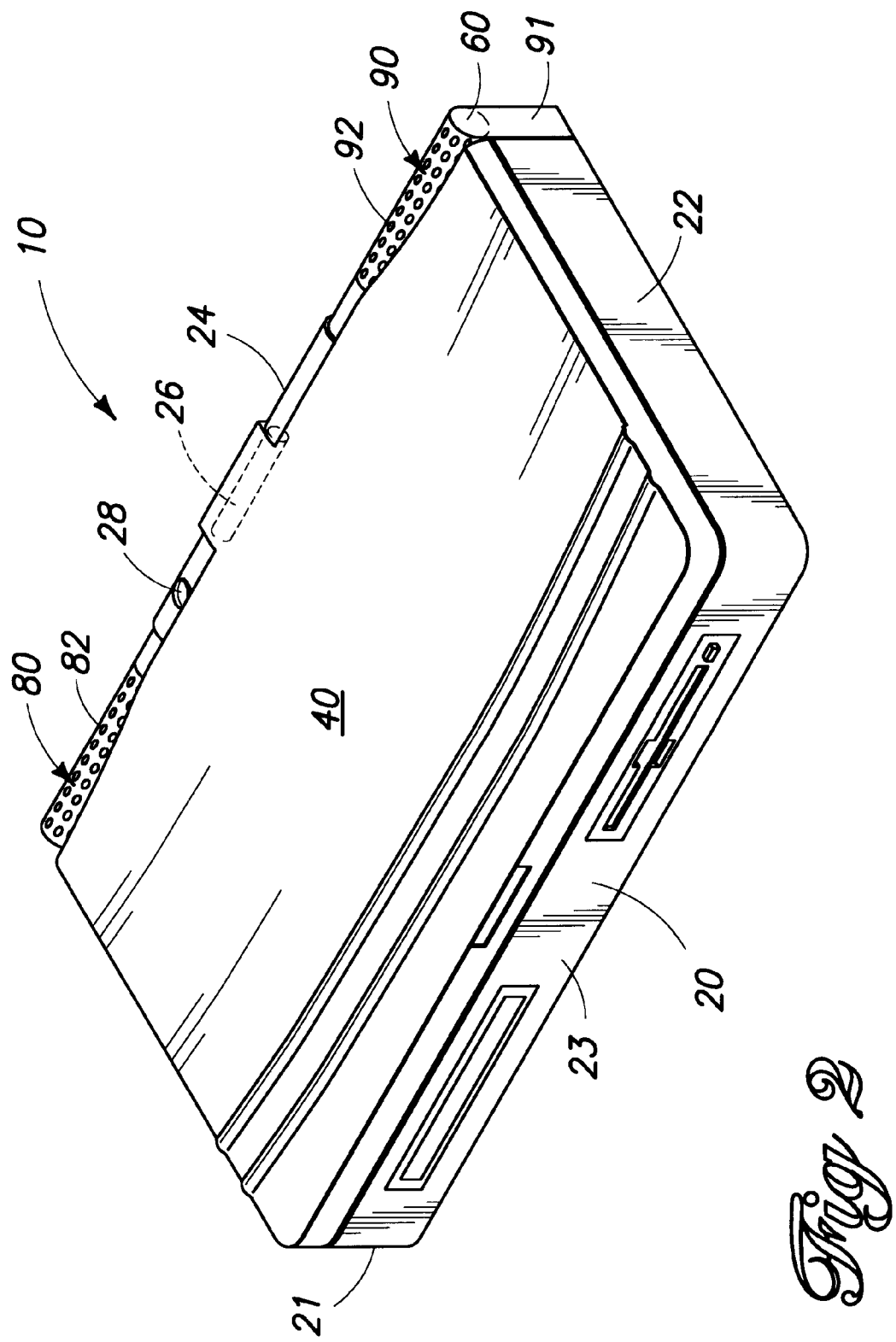
FIG. 2 shows the portable electronic device of the preferred embodiment of the invention, where the display portion is in a closed position, and where the speaker assemblies are in the normal position.

In both FIG. 1 and FIG. 2, speaker assembly 80 and speaker assembly 90 are in a normal position. In this normal position, outer edge 81 of speaker assembly 80 and outer edge 91 of speaker assembly 90 are substantially flush with left side base edge 21 and right size base edge 22 of base portion 20 of electronic device 10, respectively.

Figure 3:
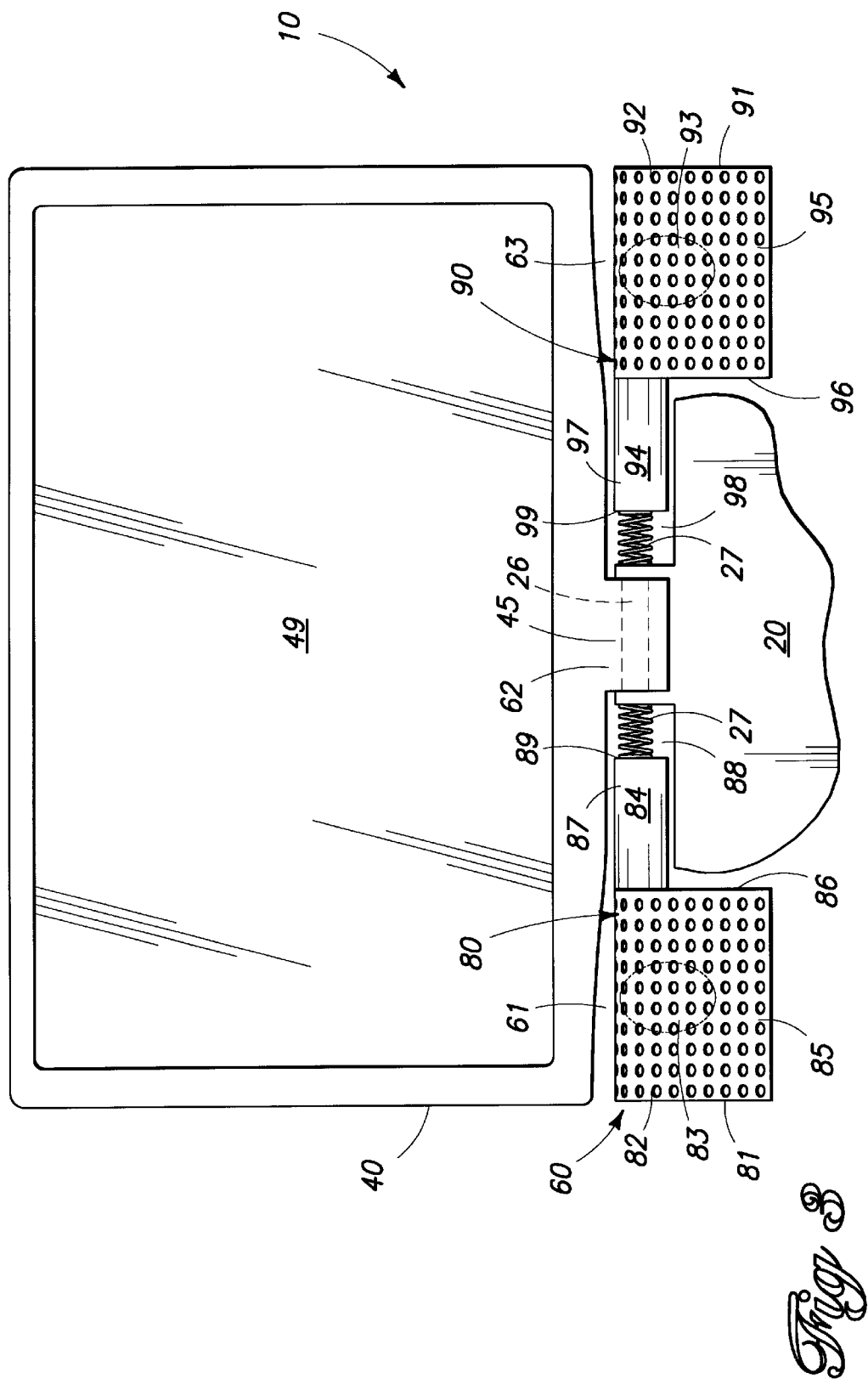
FIG. 3 shows the hinged portion of the portable electronic device of the preferred embodiment in more detail, where the speaker assemblies are in the normal position.

FIG. 3 shows hinged portion 60 of portable electronic device 10 of the preferred embodiment in more detail. As in FIG. 1 and FIG. 2, speaker assemblies 80 and 90 are shown in a normal position. Speaker assembly 80 includes winged portion 85 and tubular portion 87. Speaker 83 is contained in winged portion 85. Likewise, speaker assembly 90 includes winged portion 95 and tubular portion 97. Speaker 93 is contained in winged portion 95. Those skilled in the art will appreciate that the shape and size of winged portions 85 and 95, as well as the size and shape of tubular portions 87 and 97, can vary greatly depending on the design of electronic device 10 or other factors and still fall within the spirit and scope of the invention.

Center section 62 of hinged portion 60 contains tab 45 and hinge pin 26. In this embodiment, hinge pin 26 is connected to base portion 20, while tab 45 is connected to display portion 40. Tab 45 rotates around hinge pin 26, thereby allowing display portion 40 to be in open position and a closed position. Springs 27 are compressed when speaker assemblies 80 and 90 are in a normal position, at shown in FIG. 3. Those skilled in the art will appreciate that tab 45 can be larger or smaller than that shown in FIG. 3, depending on the size and weight of display unit 40.

Note that tubular ends 89 and 99 are preferably partially open. This allows the sound from speakers 83 and 93 to escape from tubular portions 87 and 97 into cavities 88 and 98, respectively. Speaker chamber 84 includes the interior volume of both winged portion 85 and tubular portion 87, as well as cavity 88. Likewise, speaker chamber 94 includes the interior volume of both winged portion 95 and tubular portion 97, as well as cavity 98.

Figure 4:
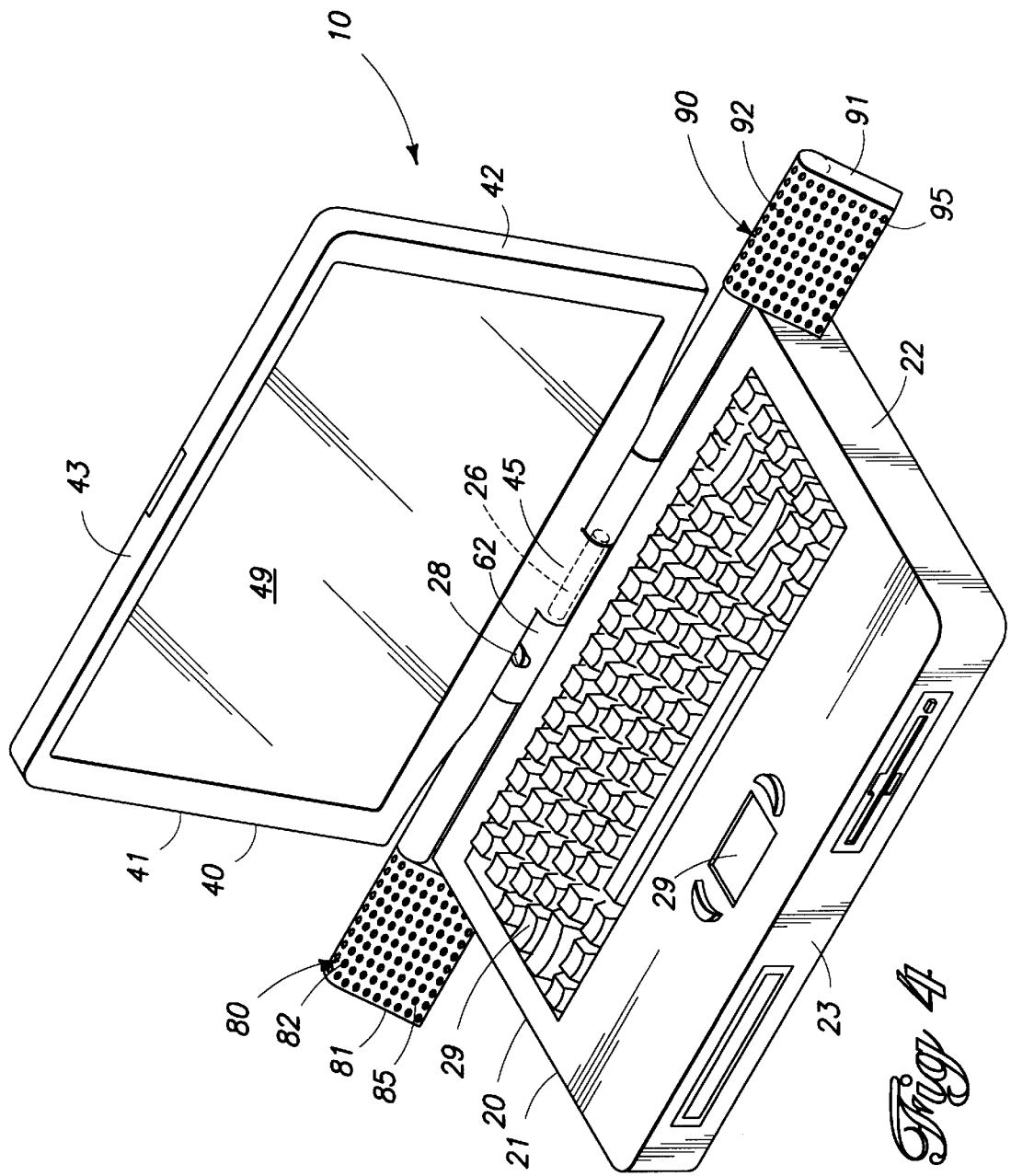
FIG. 4 shows the portable electronic device of the preferred embodiment with the speaker assemblies in an extended position.
Figure 5:
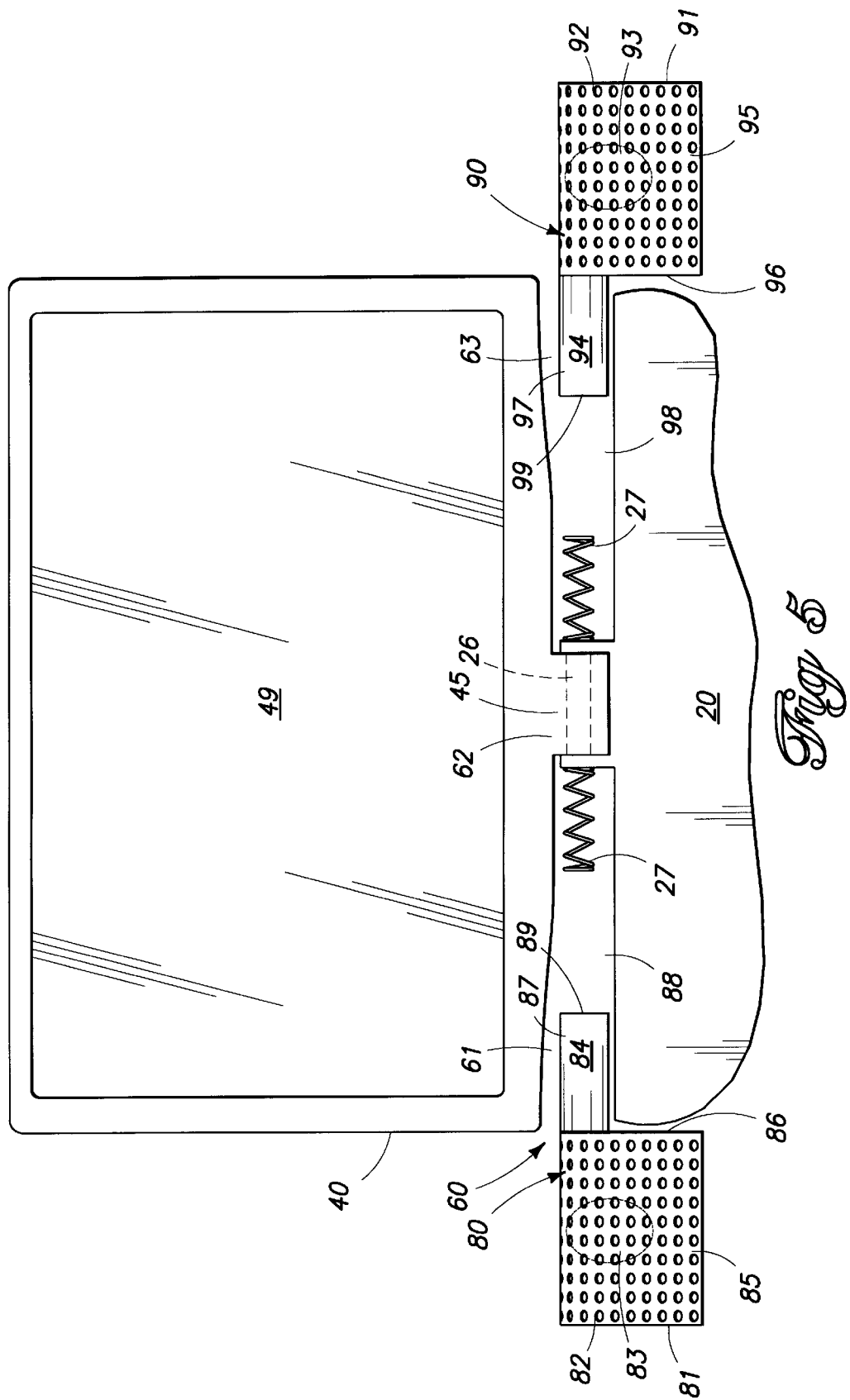
FIG. 5 shows the hinged portion of the portable electronic device of the preferred embodiment in more detail, where the speaker assemblies are in an extended position.

Release mechanism 28 (cutaway from FIG. 3—see FIG. 1), when activated, moves speaker assembly 80 and speaker assembly 90 from the normal position shown in FIGS. 1–3 to an extended position, as shown in FIG. 4 and FIG. 5. Release mechanism 28 is preferably located in hinged portion 60 to allow it to be activated by a user when display portion 40 is in either an open position or in a closed position, although alternate embodiments have been contemplated that have release mechanism 28 positioned elsewhere (e.g., above input device 29, on right side base edge 22, on left side display edge 41, etc).

Speaker assemblies 80 and 90 can be put back into the normal position from the extended position by pushing speaker assemblies 80 and 90 back into portable electronic device 10. When this is done, springs 27 compress and release mechanism 28 latches tubular portions 87 and 97 in place.

Referring now to FIG. 4, outer edge 81 and outer edge 91 are no longer substantially flush with the outer shell of portable electronic device 10 (left base edge 21 and right base edge 22, respectively). In fact, as FIG. 4 shows, inner edge 86 of speaker assembly 80, and inner edge 96 of speaker assembly 90, extend beyond left side base edge 21 and right side base edge 22 of base unit 20, respectively. When speaker assemblies 80 and 90 are in this extended position, they are preferably rotatable about an axis provided by tubular portions 84 and 94. This allows the user to more finely direct the sound from speakers 83 and 93, respectively. In addition, the rotatable nature of speaker assemblies 80 and 90 allow sound to be more finely directed to an audience, such as when electronic device 10 is being used as a presentation device. In fact, speaker assemblies 80 and 90 can be rotated 180 degrees from the position shown in FIG. 4 to direct sound to users located behind electronic device 10, as may be appropriate when electronic device 10 is used in conjunction with a projection screen located behind the presenter.

FIG. 5 shows hinged portion 60 of portable electronic device 10 of the preferred embodiment in more detail, where speaker assemblies 80 and 90 are in an extended position. Note that in this extended position, springs 27 are no longer compressed. When release mechanism 28 is activated, springs 27 move speaker assemblies 80 and 90 into the extended position. Note that in this extended position, cavities 88 and 98 are larger then when speaker assemblies 80 and 90 are in a normal position. Since tubular ends 89 and 99 are at least partially open, this allows for speaker chamber 84 and speaker chamber 94 to have a larger volume when speaker assemblies 80 and 90 are in an extended position, as shown in FIG. 5, than when first speaker assemblies 80 in 90 are in a normal position, as shown in FIG. 3. This larger volume improve the sound quality of speakers 83 and 93, especially at lower frequencies.

FIG. 6 shows portable electronic device 10' of an alternate embodiment of the invention, where speaker assemblies 80' and 90' are in an extended position. Note that this embodiment, speaker assemblies 80' and 90' are in a more upright position than speaker assemblies 80 and 90 of FIG. 4.

FIG. 7 shows hinged portion 60' of portable electronic device 10' of the alternate embodiment of FIG. 6 in more detail, where the speaker assemblies 80' and 90' are in a normal position. Note that in this embodiment, speaker assemblies 80' and 90' are located in display unit 40' of electronic device 10'. In this embodiment, tab 45' is connected to base unit 20', and hinge pin 26' is connected to display unit 40'. As before, those skilled in the art will appreciate that tab 45' can be larger or smaller than that shown in FIG. 7, depending on the size and weight of display unit 40'.

FIG. 8 shows portable electronic device 100 of another alternate embodiment of the invention, where speaker assemblies 180 and 190 are in a normal position and are located near the front of portable electronic device 100. While electronic device 100 is shown in FIG. 8 having a base portion 120 and a display portion 140, an alternate embodiment has been contemplated where portable electronic device 100 does not have display portion 140.

Those skilled in the art will appreciate that speaker assemblies 180 and 190 could be located in different places in portable electronic device 100 than those shown in FIG. 8 and still fall within the spirit and scope of the invention.

If the speaker assemblies are positioned between the display and the keyboard (such as in the hinged portion, as shown and described in the preferred embodiment), additional acoustical advantages are offered over other positions, since sound waves emanating from the speakers in this position can reflect off of the display screen and be redirected towards the user, thereby enhancing the sound that the user experiences. Despite this advantage, other speaker positions may still be desirable in terms of cost, ease of use, etc.

FIG. 9 shows the front portion of portable electronic device 100 of the alternate embodiment of FIG. 8 in more detail, where speaker assemblies 180 and 190 are in a normal position. Speaker assembly 180 contains speaker 183 and winged portion 185. Likewise, speaker assembly 190 contains speaker 193 and winged portion 195.

Note that winged ends 189 and 199 are preferably partially open. This allows the sound from speakers 183 and 193 to escape from winged portions 185 and 195 into cavities 188 and 198, respectively. Speaker chamber 184 includes the interior volume of both winged portion 185 and cavity 188. Likewise, speaker chamber 194 includes the interior volume of winged portion 195 and cavity 198.

Release mechanism 128, when activated, moves speaker assembly 180 and speaker assembly 190 from the normal position shown in FIGS. 8 and 9 to an extended position, as shown in FIG. 10 and 11. Referring now to FIG. 11, outer edge 181 and outer edge 191 are no longer substantially flush with outer shell 110 of portable electronic device 100.

Preferably, controls 186 and 196 are exposed when speaker assemblies 180 and 190 are in an extended position. These controls could be used to control speaker volume, balance, tone, etc, to provide for more refined control of the sound of electronic device 100. In addition, these controls could be used for other purposes to provide non-sound control of electronic device 100.

Winged portions 185 and 195 are preferably made out of a rigid plastic material, but an alternate embodiment has been contemplated where winged portions 185 and 195 are made out of a compressible material, such as a bellows-type material or a foam rubber-type material. In this embodiment, winged portions 185 and 195 can expand when in an extended position to a volume greater than what they take up inside electronic device 100 in a normal position.

Speaker assemblies 180 and 190 can be put back into the normal position from the extended position by pushing speaker assemblies 180 and 190 back into portable electronic device 100. When this is done, springs 127 compress and release mechanism 128 latches winged portions 185 and 195 in place.

FIG. 11 shows the front portion of portable electronic device 100 of the alternate embodiment in more detail, where speaker assemblies 180 and 190 are in an extended position. Note that in this extended position, springs 127 are no longer compressed. When release mechanism 128 is activated, springs 127 move speaker assemblies 180 and 190 into the extended position. Note that in this extended position, cavities 188 and 198 are larger than when speaker assemblies 180 and 190 are in a normal position. Since winged ends 189 and 199 are at least partially open, this allows for speaker chamber 184 and speaker chamber 194 to have a larger volume when speaker assemblies 180 and 190 are in an extended position, as shown in FIG. 11, than when speaker assemblies 180 in 190 are in a normal position, as shown in FIG. 9. This larger volume improve the sound quality of speaker 183 and 193, especially at lower frequencies.

An alternate embodiment has been contemplated where speaker assemblies 180 and 190 are contained on front edge 115 of portable electronic device 100 (FIG. 8) and remain fixed in place. In this embodiment, when release mechanism 128 is activated, center portion 119 is movable and moves outwardly into an extended position, thereby increasing the volume of the speaker chambers of speaker assemblies 180 and 190. When movable portion 119 is in an extended position, the outer edge of movable portion 1 19 extends beyond (i.e., is no longer substantially flush with) front edge 115 of portable electronic device 100.

What is claimed is:

1. A portable electronic device, comprising:

a base portion having a left base edge, a right side base edge, a front base edge, and a back base edge, said base portion further comprising an input device;

a display portion having a left side display edge, a right side display edge, a front display edge, and a back display edge;

said base portion and said display portion connected by a hinged portion, said hinged portion having a left section, a center section and a right section;

a first speaker assembly located in said left section of said hinged portion;

a second speaker assembly located in said right section of said hinged portion;

said hinged portion allowing said display portion to be in an open position and a close position;

said first speaker assembly further comprising a first speaker, a first speaker chamber, a first outer edge, and a first speaker grille;

said second speaker assembly further comprising a second speaker, a second speaker chamber, a second outer edge, and a second speaker grille;

said first speaker grille and said second speaker grille positioned to direct sound from said first and second speakers to a user of said portable electronic device regardless of whether said display portion is in said open position or said closed position;

wherein said first and second speaker assemblies each have a normal position and an extended position, said normal position being where said first outer edge is substantially flush with said left base edge of said electronic device, and said second outer edge is substantially flush with said right side base edge of said electronic device, and wherein said extended position being where said first outer edge extends beyond said left base edge of said electronic device, and said second outer edge extends beyond said right side base edge of said electronic device.

2. The portable electronic device of claim 1, wherein said first speaker assembly and said second speaker assembly are located in said base unit of said portable electronic device when said first speaker assembly and said second speaker assembly are in said normal position.

3. The portable electronic device of claim 1, wherein said first speaker assembly and said second speaker assembly are located in said display unit of said portable electronic device when said first speaker assembly and said second speaker assembly are in said normal position.

4. A portable electronic device, comprising:
 a base portion having a left base edge, a right side base edge, a front base edge, and a back base edge, said base portion further comprising an input device;
 a display portion having a left side display edge, a right side display edge, a front display edge, and a back display edge;
 said base portion and said display portion connected by a hinged portion, said hinged portion having a left section, a center section and a right section;
 a first speaker assembly located in said left section of said hinged portion;
 a second speaker assembly located in said right section of said hinged portion;
 said hinged portion allowing said display portion to be in an open position and a close position;
 said first speaker assembly further comprising a first speaker, a first speaker chamber, a first speaker grille, and a first winged portion having a first outer edge and a first inner edge, and a first tubular portion connected to said first inner edge;
 said second speaker assembly further comprising a second speaker, a second speaker chamber, a second outer edge, and a second speaker grille;
 said first speaker grille and said second speaker grille positioned to direct sound from said first and second speakers to a user of said portable electronic device regardless of whether said display portion is in said open position or said closed position;
 wherein said first and second speaker assemblies each have a normal position and an extended position, said normal position being where said first outer edge is substantially flush with said left base edge of said electronic device, and said second outer edge is substantially flush with said right side base edge of said electronic device, and
 wherein said extended position being where said first outer edge extends beyond said left base edge of said electronic device, and said second outer edge extends beyond said right side base edge of said electronic device.

5. The portable electronic device of claim 4, wherein said second speaker assembly further comprises:
 a second winged portion having said second outer edge and an second inner edge; and
 a second tubular portion connected to said second inner edge.

6. The portable electronic device of claim 5, wherein said extended position being where said first inner edge extends beyond said left side base edge of said electronic device, and said second inner edge extends beyond said right side base edge of said electronic device.

7. The portable electronic device of claim 6, wherein said first speaker assembly is rotatable about an axis provided by said first tubular portion when said first speaker assembly is in said extended position, and wherein said second speaker assembly is rotatable about an axis provided by said second tubular portion when said second speaker assembly is in said extended position.

8. A portable electronic device, comprising:
 a base portion having a left base edge, a right side base edge, a front base edge, and a back base edge, said base portion further comprising an input device;
 a display portion having a left side display edge, a right side display edge, a front display edge, and a back display edge;
 said base portion and said display portion connected by a hinged portion, said hinged portion having a left section, a center section and a right section;
 a first speaker assembly located in said left section of said hinged portion;
 a second speaker assembly located in said right section of said hinged portion;
 said hinged portion allowing said display portion to be in an open position and a close position;
 said first speaker assembly further comprising a first speaker, a first speaker chamber, a first outer edge, and a first speaker grille;
 said second speaker assembly further comprising a second speaker, a second speaker chamber, a second outer edge, and a second speaker grille;
 said first speaker grille and said second speaker grille positioned to direct sound from said first and second speakers to a user of said portable electronic device regardless of whether said display portion is in said open position or said closed position;
 wherein said first and second speaker assemblies each have a normal position and an extended position, said normal position being where said first outer edge is substantially flush with said left base edge of said electronic device, and said second outer edge is substantially flush with said right side base edge of said electronic device,
 wherein said extended position being where said first outer edge extends beyond said left base edge of said electronic device, and said second outer edge extends beyond said right side base edge of said electronic device; and
 wherein said first speaker chamber has a larger volume when said first speaker assembly is in said extended position than when said first speaker assembly is in said normal position.

9. The portable electronic device of claim 8, wherein said second speaker chamber has a larger volume when said second speaker assembly is in said extended position than when said second speaker assembly is in said normal position.

10. The portable electronic device of claim 9, further comprising:
 a release mechanism that, when activated, moves said second speaker assembly from said normal position to said extended position.

11. The portable electronic device of claim 8, further comprising:
 a release mechanism that, when activated, moves said first speaker assembly from said normal position to said extended position.

12. A portable electronic device, comprising:
 an outer shell;
 a first speaker assembly having a first speaker, a first speaker chamber, and a first outer edge;
 a second speaker assembly having a second speaker, a second speaker chamber, and a second outer edge;

said first and second speaker assemblies each having a normal position and an extended position, wherein said first outer edge and said second outer edge are substantially flush with said outer shell of said portable electronic device when said first speaker assembly and said second speaker assembly are in said normal position, and wherein said first outer edge and said second outer edge extend beyond said outer shell of said portable electronic device when said first speaker assembly and said second speaker assembly are in said extended position; and wherein said first speaker chamber has a larger internal volume when said first speaker assembly is in said extended position than when said first speaker assembly is in said normal position, and wherein said second speaker chamber has a larger internal volume when said second speaker assembly is in said extended position than when said second speaker assembly is in said normal position.

13. The portable electronic device of claim 12, further comprising:

a release mechanism that, when activated, moves said first speaker assembly from said normal position to said extended position.

14. The portable electronic device of claim 12, further comprising:

a release mechanism that, when activated, moves said second speaker assembly from said normal position to said extended position.

15. The portable electronic device of claim 12, wherein said first and second speaker assemblies further comprises first and second winged portions, wherein said first and second winged portions are made of a rigid material.

16. The portable electronic device of claim 12, wherein said first and second speaker assemblies further comprises first and second winged portions, wherein said first and second winged portions are made of a compressible material.

17. A portable electronic device, comprising;

an outer shell;

a first speaker assembly having a first speaker, a first speaker chamber, and a first outer edge;

a second speaker assembly having a second speaker, a second speaker chamber, and a second outer edge;

wherein said first and second speaker assemblies further comprises first and second winged portions, said first winged portion further comprising a control button;

said first and second speaker assemblies each having a normal position and an extended position, wherein said first outer edge and said second outer edge are substantially flush with said outer shell of said portable electronic device when said first speaker assembly and said second speaker assembly are in said normal position, and wherein said first outer edge and said second outer edge extend beyond said outer shell of said portable electronic device when said first speaker assembly and said second speaker assembly are in said extended position; and wherein said first speaker chamber has a larger volume when said first speaker assembly is in said extended position than when said first speaker assembly is in said normal position, and wherein said second speaker chamber has a larger volume when said second speaker assembly is in said extended position than when said second speaker assembly is in said normal position.

18. In a portable electronic device having an outer shell, a first speaker assembly having a first speaker, a first speaker chamber, and a first outer edge, and a second speaker assembly having a second speaker, a second speaker chamber, and a second outer edge, a method for moving said first and second speaker assemblies between a normal position, where said first outer edge and said second outer edge are substantially flush with said outer shell of said portable electronic device, to an extended position, where said first outer edge and said second outer edge extend beyond said outer shell of said portable electronic device, comprising the steps of:

when said first and second speaker assemblies are in said normal position, activating a release mechanism to move said first and second speaker assemblies to an extended position wherein said first and second speaker chambers have a larger internal volume than when said first and second speaker chambers are in said normal position;

when said first and second speaker assemblies are in said extended position, pushing said first and second speaker assemblies back into said normal position.

19. A portable electronic device, comprising:

an outer shell;

a first speaker assembly having a first speaker and a first speaker chamber;

a second speaker assembly having a second speaker and a second speaker chamber;

a movable portion between said first speaker assembly and said second speaker assembly, said movable portion having an outer edge;

said movable portion having normal position and an extended position, wherein in said normal position said outer edge is substantially flush with said outer shell of said portable electronic device, and wherein in said extended position said outer edge extends beyond said outer shell of said portable electronic device; and wherein said first speaker chamber has a larger volume when said movable portion is in said extended position than when said movable portion is in said normal position, and wherein said second speaker chamber has a larger volume when said movable portion is in said extended position than when said movable portion is in said normal position.

* * * * *